(12) United States Patent
Subramanian et al.

(10) Patent No.: US 6,970,943 B1
(45) Date of Patent: Nov. 29, 2005

(54) ROUTING ARCHITECTURE INCLUDING A COMPUTE PLANE CONFIGURED FOR HIGH-SPEED PROCESSING OF PACKETS TO PROVIDE APPLICATION LAYER SUPPORT

(75) Inventors: Siva Subramanian, Cary, NC (US); Tal I. Lavian, Sunnyvale, CA (US)

(73) Assignee: Nortel Networks Limited, St. Laurent (CA)

( * ) Notice: Subject to any disclaimer, the term of this patent is extended or adjusted under 35 U.S.C. 154(b) by 1028 days.

(21) Appl. No.: 09/736,692

(22) Filed: Dec. 13, 2000

Related U.S. Application Data

(60) Provisional application No. 60/239,484, filed on Oct. 11, 2000.

(51) Int. Cl.[7] ............................................. G06F 15/173
(52) U.S. Cl. .................... 709/238; 709/223; 709/225; 709/226; 709/227; 709/230; 709/232
(58) Field of Search ................................ 709/200, 202, 709/223, 225, 226, 227, 238, 239, 230, 232

(56) References Cited

U.S. PATENT DOCUMENTS

| | | | | |
|---|---|---|---|---|
| 5,167,033 | A | 11/1992 | Bryant et al. | 709/235 |
| 5,377,327 | A | 12/1994 | Jain et al. | 709/235 |
| 5,495,426 | A | 2/1996 | Waclawsky et al. | 709/226 |
| 5,854,899 | A | 12/1998 | Callon et al. | 709/238 |
| 6,044,075 | A | 3/2000 | Le Boudec et al. | 370/351 |
| 6,078,953 | A | 6/2000 | Vaid et al. | 709/223 |
| 6,092,096 | A * | 7/2000 | Lewis | 709/200 |
| 6,134,589 | A * | 10/2000 | Hultgren | 709/227 |
| 6,151,633 | A | 11/2000 | Hurst et al. | 709/235 |
| 6,157,941 | A * | 12/2000 | Verkler et al. | 709/202 |
| 6,226,267 | B1 | 5/2001 | Spinney et al. | 370/235 |
| 6,286,052 | B1 | 9/2001 | McCloghrie et al. | 709/238 |
| 6,289,389 | B1 | 9/2001 | Kikinis | 709/239 |
| 6,424,621 | B1 | 7/2002 | Ramaswamy et al. | 370/230 |
| 6,560,644 | B1 * | 5/2003 | Lautmann et al. | 709/223 |
| 6,570,867 | B1 | 5/2003 | Robinson et al. | 370/351 |
| 6,611,872 | B1 * | 8/2003 | McCanne | 709/238 |
| 6,611,874 | B1 * | 8/2003 | Denecheau et al. | 709/239 |
| 6,754,219 | B1 * | 6/2004 | Cain et al. | 370/401 |
| 6,757,289 | B1 * | 6/2004 | Cain et al. | 370/401 |
| 6,785,704 | B1 * | 8/2004 | McCanne | 718/105 |
| 6,792,461 | B1 * | 9/2004 | Hericourt | 709/225 |
| 6,810,421 | B1 * | 10/2004 | Ishizaki et al. | 709/226 |
| 6,810,427 | B1 * | 10/2004 | Cain et al. | 709/238 |

* cited by examiner

Primary Examiner—Nabil El-Hady
(74) Attorney, Agent, or Firm—Withrow & Terranova, PLLC

(57) ABSTRACT

The present invention provides a routing architecture including a control plane, a compute plane, and a forward plane. The forward plane provides traditional forwarding of packets to the next-hop address, along with any necessary header manipulation, while the control plane configures the forward plane and the compute plane for desired operation. The compute plane is configured for high-speed processing of packets to provide application level support, including manipulating application data in the payload of the packets during routing. The forward plane preferably implements forwarding rules using filters sufficient to forward a received packet to the next-hop address, to the compute plane for application processing, or to the control plane to facilitate control or configuration.

37 Claims, 4 Drawing Sheets

ROUTING ARCHITECTURE INCLUDING A COMPUTE PLANE CONFIGURED FOR HIGH-SPEED PROCESSING OF PACKETS TO PROVIDE APPLICATION LAYER SUPPORT

This application claims the benefit of provisional application No. 60/239,484, filed Oct. 11, 2000, entitled COMPUTATION IN NETWORK DEVICES, and is related to application Ser. No. 09/736,678, filed Dec. 13, 2000, entitled DISTRIBUTED COMPUTATION IN NETWORK DEVICES and Ser. No. 09/736,674, filed Dec. 13, 2000, entitled SERVICE BASED ROUTING, the disclosures of which are incorporated herein by reference in their entirety.

FIELD OF THE INVENTION

The present invention relates to processing and routing packets in a network, and in particular, to providing high-speed, application level processing on the packets during routing.

BACKGROUND OF THE INVENTION

Existing routers have limited computation capacity and offer little or no application layer support during routing. These routers are typically divided into a control plane and a forward plane. The control plane is used for basic setup and control of the router. For example, the control plane is generally used to establish routing tables used by the forward plane. The forward plane receives packets, processes the packets based on the routing tables set up by the control plane, and delivers the packets to the next-hop address or the final destination, depending on the termination point for each packet.

The forward plane in existing routers is typically limited to packet delivery based on basic header analysis and manipulation. Application layer support, such as that requiring analysis or manipulation of the packet's payload, is typically avoided. Those specially configured devices capable of providing application processing, such as firewalls, are uniquely configured for the special application wherein the routing speeds for normal routing in the forward plane are significantly impacted or the control plane is uniquely adapted to handle such processing. In either case, basic routing capability of the forward plane is inhibited. Thus, traditional network routers typically do not provide application level processing, and routing devices providing such support are only used in limited applications.

Given the general desire to distribute processing over a network, there is a need for efficient routing devices capable of providing application level processing without significantly impacting forwarding performance for the packets being processed at an application level or for those requiring only basic routing. There is a further need to provide a routing device that is readily configurable to provide various types of application support in any number of network environments.

SUMMARY OF THE INVENTION

The present invention provides a routing architecture including a control plane, a compute plane, and a forward plane. The forward plane provides traditional forwarding of packets to the next-hop address, along with any necessary header manipulation, while the control plane configures the forward plane and the compute plane for desired operation. The compute plane is configured for high-speed processing of packets to provide application level support, including manipulating application data in the payload of the packets during routing.

The forward plane preferably implements forwarding rules using filters sufficient to forward a received packet to the next-hop address, to the compute plane for application processing, or to the control plane to facilitate control or configuration. For those packets not sent to the compute plane or control plane, the forward plane will provide any necessary processing and forward the packets from an input port to an output port. Additionally, the forward plane receives packets from the control plane and the compute plane for forwarding after processing by the respective planes.

Preferably, the compute plane is implemented using high-speed field programmable gate arrays (FPGAs), application specific integrated circuits (ASICs), digital signal processors (DSP), network processors, or a combination thereof sufficient to provide processing speeds that are close to forwarding speeds of the forward plane. Further, the compute plane is preferably configurable by the control plane to provide various types of application processing. The compute plane may be configured to provide different types of application processing for different packets. The forward plane may be set to determine where to send the packets in the compute plane for processing, or the compute plane may determine how or where to process the packets upon receipt.

With the present invention, the routing device is able to perform application level processing on packets without impacting forwarding performance. The invention separates the task of control from computation to avoid negatively impacting performance for either task. A new, high-speed computation plane is provided in the routing device to handle application level processing, while the forward plane provides basic forwarding. The routing abilities of the present invention may be provided in any number of network devices, including traditional routers and media gateways capable of routing packets over homogeneous or heterogeneous networks.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of the specification illustrate several aspects of the invention, and together with the description serve to explain the principles of the invention.

DETAILED DESCRIPTION OF THE PREFERRED EMBODIMENTS

The present invention provides for a routing node having a separate processing plane for application layer support during routing. The application layer support may include any type of processing or network service on packet content. In addition to forward and control planes, the routing node includes a separate compute plane for processing packets according to specific applications during routing. The forward plane provides traditional forwarding, along with any necessary header manipulation, while the control plane preferably configures the forward plane and the compute plane as desired. Upon reading the following description in light of the accompanying drawing figures, those skilled in the art will understand the concepts of the invention and will recognize applications of these concepts not particularly addressed herein. It should be understood that these concepts and applications fall within the scope of this disclosure and the accompanying claims.

Figure 1:
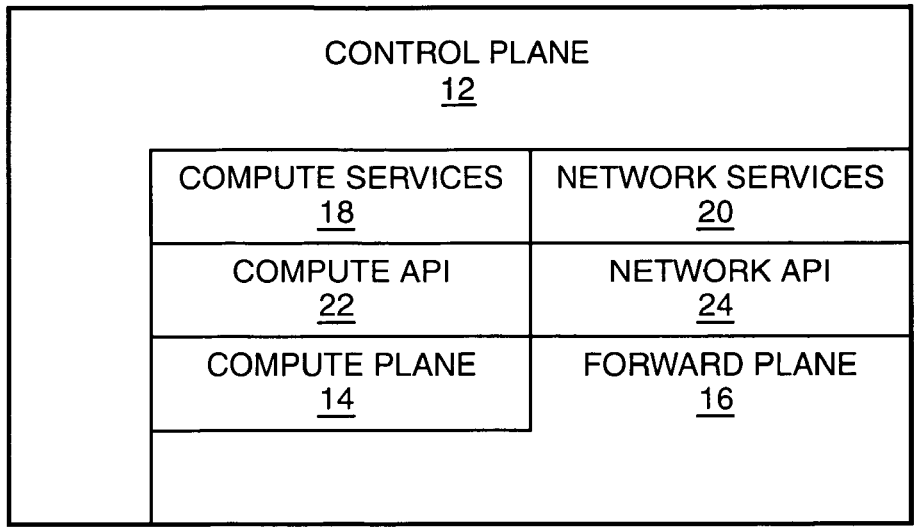
FIG. 1 depicts a preferred architecture for a routing node constructed according to the present invention.

The embodiments set forth below represent the necessary information to enable those skilled in the art to practice the invention and illustrate the best mode of practicing the invention. With reference to FIG. 1, a routing node is illustrated and generally referenced as 10. The routing node 10 is divided into three primary processing planes; a control plane 12, a compute plane 14, and a forward plane 16. Preferably, all incoming packets are received by the forward plane 16 through various ports interacting with a network, such as a packet-switched network. The forward plane 16 is configured to analyze each of the incoming packets and determine where to send each packet. In general, the incoming packets need to be forwarded on toward their final destination, to the control plane 12, or to the compute plane 14.

Figure 2:
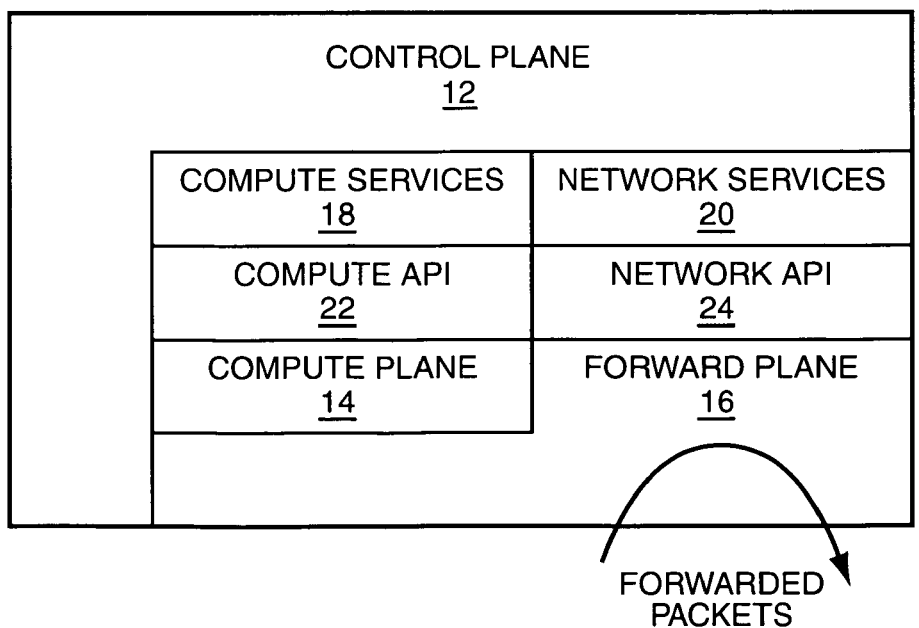
FIG. 2 illustrates the forwarding path of packets processed within the forward plane of the architecture shown in FIG. 1.

Depending on the extent or nature of any necessary manipulation of the packet, the packet may be processed by the forward plane 16 and forwarded to the next-hop routing node or final destination. Preferably, any packet processing provided by the forward plane 16 is limited to manipulating information in one or more headers of the packet as necessary in traditional routing. As depicted in FIG. 2, packets requiring only traditional routing are maintained in the forward plane 16 for processing and immediately forwarded to the next-hop routing node or destination.

Figure 3:
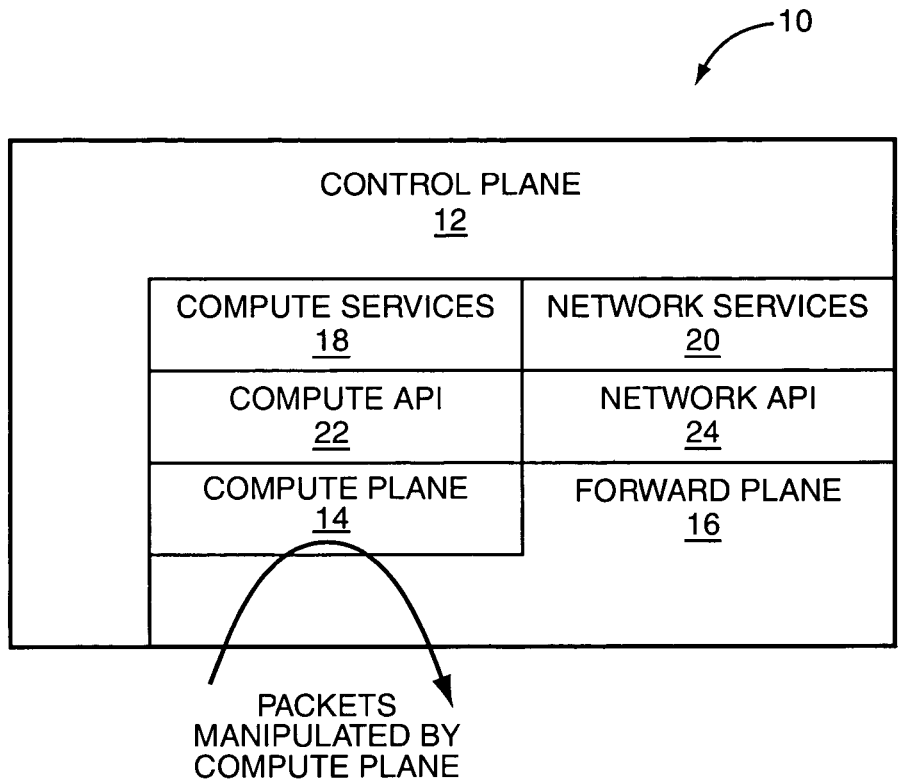
FIG. 3 illustrates the forwarding path of packets processed by the compute plane of the architecture shown in FIG. 1.

Packets entering the forward plane 16 that require application level processing, which may entail manipulation of the packet's payload, are directed to the compute plane 14 by the forward plane 16. As depicted in FIG. 3, these packets are passed through the forward plane 16 to the compute plane 14 for processing and then sent back to the forward plane 16, which will forward the processed packet to the next-hop routing node or final destination.

Although additional detail is provided below, the compute plane 14 provides application level processing, and any necessary payload manipulation required by such processing. During processing by the compute plane 14, the payload may be reviewed, removed, modified, and repacked as directed by any number of applications. The routing node 10 preferably supports programming and unique configuration of the compute plane 14 and the forward plane 16.

Any number of applications may be supported through the compute plane 14. For example, Internet Protocol (IP) security and secure socket layer (SSL) applications may be implemented in a routing node 10 using the compute plane 14. Various types of multimedia applications are made possible, alone or in combination with other applications. Further, incorporating a high-speed compute plane 14 for application specific packet processing enables streaming applications and minimizes or eliminates the need for buffering. The compute plane 14 is capable of implementing virtually any type of application, ranging from carrying out mathematical operations on payloads to implementing compression and encryption algorithms. The compute plane 14 may also help facilitate high-speed firewalls acting as a single point of entry or distributed to provide multiple points of entry. Typically, the compute plane 14 operates on layer four and higher protocols that are typically application related.

Figure 4:
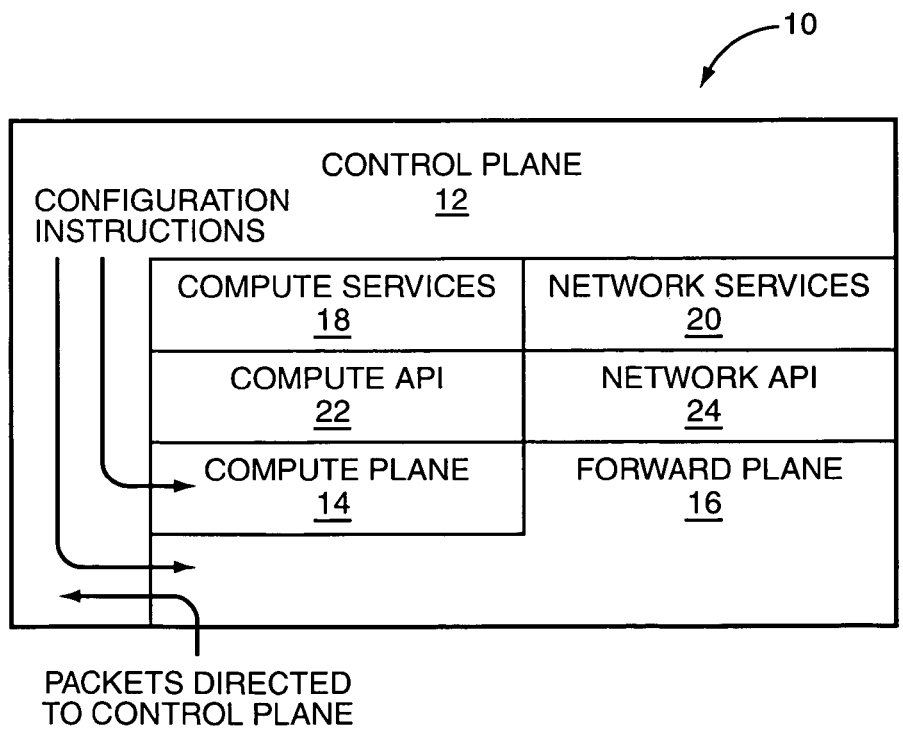
FIG. 4 illustrates the forwarding path of packets directed to the control plane and the path of instructions for configuring the compute plane and forward plane from the control plane according to a preferred embodiment of the present invention.

In addition to traditional forwarding of incoming packets and directing packets to the compute plane 14 for processing, the forward plane 16 may direct selected incoming packets to the control plane 12 for basic communications with the routing node 10 as shown in FIG. 4. In essence, the control plane 12 provides overall control and configuration for the routing node 10, and in particular, for the compute plane 14 and the forward plane 16. This control may range from running diagnostics to setting configurations for the compute plane 14 and the forward plane 16. These settings may dictate the type of processing to carry out on the incoming packets and which plane handles the processing.

Returning now to FIG. 1, the routing node 10 may support various services, which are groups of code or objects that implement specific functionality. Preferably, these services use Java code and may be divided into compute services 18 related to the compute plane 14, and network services 20 related to the operation of the forward plane 16. Each of these services cooperates with the corresponding compute plane 14 and forward plane 16 via a compute application program interface (API) 22 and network API 24, respectively. Since the services are preferably Java compatible, the compute API 22 and network API 24 may specify interfaces for Java applications to control the respective compute plane 14 and forward plane 16.

Preferably, the network API 24 can be used to instruct the forward plane 16 to alter packet processing through the installation of hardware or software filters that facilitate forwarding rules. These filters execute actions specified by a defined filter policy. Typically, these filters can be based on combinations of fields in the machine address, IP address, and transport headers. The filters may also be configured to trigger on a payload as well. The filter policy can define where the matching packets are delivered and can also be used to alter the packet content as noted above.

Typical packet delivery options include discarding matching packets and diverting matching packets to the control plane 12 or compute plane 14 based on the filter policy. With the present invention, a high-speed compute plane 14 is provided to handle such processing. Additionally, packets may be "copied" to the control or compute planes 12, 14 or may be mirrored to a selected interface. Packets may also be identified as being part of high-priority flow; these packets can be placed in a high-priority queue and delivered accordingly. As noted, the filter policy can also cause packet and header content to be selectively altered for most of these operations. The particular plane handling the processing is capable of re-computing IP header check sums at high speeds when and if the IP header or payload is changed.

In the present invention, all control plane computations, such as installing new routing tables or parsing a new Internet Control Message Protocol (ICMP) message type, are easily accommodated through the network API 24. Through the network API 24, the forward plane 16 may provide a number of services. The applications are typically contained within the forward plane 16 and will not require additional processing by the compute plane 14 for traditional operation. The following list of services is merely exemplary and is not intended to limit the scope of the present invention.

A filtering firewall may be implemented that allows or denies packets to traverse specified interfaces depending on whether the packet header matches a given bit map. An application specific firewall may be implemented that dynamically changes the firewall rules according to the application. For example, a file transfer protocol (FTP) gateway that dynamically changes the firewall rules to allow FTP data connections to a trusted host can be implemented. Security functions like stopping Transmission Control Protocol (TCP) segments with no or all bits set can also be dynamically programmed.

Dynamic Real-Time Transfer Protocol (RTP) flow identification is possible. RTP over User Datagram Protocol (UDP) flows, which are often not well known, are identified by a UDP port number. Mechanisms can be implemented to identify RTP flows based on the UDP port number. For example, control protocol messages, such as those used in Session Initiation Protocol (SIP), Real Time Streaming Protocol (RTSP), and H.323, can be intercepted and parsed for their RTP port numbers. Various differential services may be provided. For example, the forward plane 16 may be configured as a differential service classifier by properly programming the filters or forwarding rules. Since the forward plane 16 may change selected bits and IP header at line speed, the routing node 10 can be used to implement ingress/egress marker capabilities for differential services. Reliable multi-casts are also made possible with proper forwarding rules.

In addition to being able to copy certain packets for inspection by the control plane 12, the forward plane 16 may be used to divert acknowledgements from multi-cast sessions to the control plane 12. For example, the forward plane 16 can send one copy of the acknowledgment to the control plane 12 and suppress duplicate acknowledgements. Additionally, a token bucket system may be arranged where a configurable buffer is implemented with a specified packet draining rate. Differential service shapers and assorted RSVP policies can be implemented as well. RSVP is a resource reservation setup protocol for the Internet. Its major features include: (1) the use of "soft state" in the routers, (2) receiver-controlled reservation requests, (3) flexible control over sharing of reservations and forwarding of subflows, and (4) the use of IP multicast for data distribution. For additional information regarding RSVP, please see the Internet Engineering Task Force's RFCs 2205 through 2210, which are incorporated herein by reference in their entirety.

The various functions provided by the forward plane 16 listed above relate to analyzing incoming packets, manipulating packet headers, if necessary, and forwarding the packets to the next-hop or destination at high speeds.

The present invention supplements these abilities with high-speed, preferably line rate, processing capabilities at an application level. As noted, the compute plane 14 is preferably used to manipulate packet data or payloads beyond layer three or four protocols that provide application layer support. Thus, instead of analyzing or modifying the header on a packet, data analysis and manipulation associated with application layers in the packet is possible in the compute plane 14.

Importantly, the compute plane 14 provides application support efficiently and at high speeds without impacting the traditional routing speeds of the forward plane 16. Further, the application layer processing is provided at much faster speeds in the compute plane 14 than would be possible in the control plane 12. In addition to increased routing speeds and efficiency for application support, the compute plane 14 allows significant configuration of routing nodes 10 to facilitate any number of applications or combinations thereof.

Figure 5:
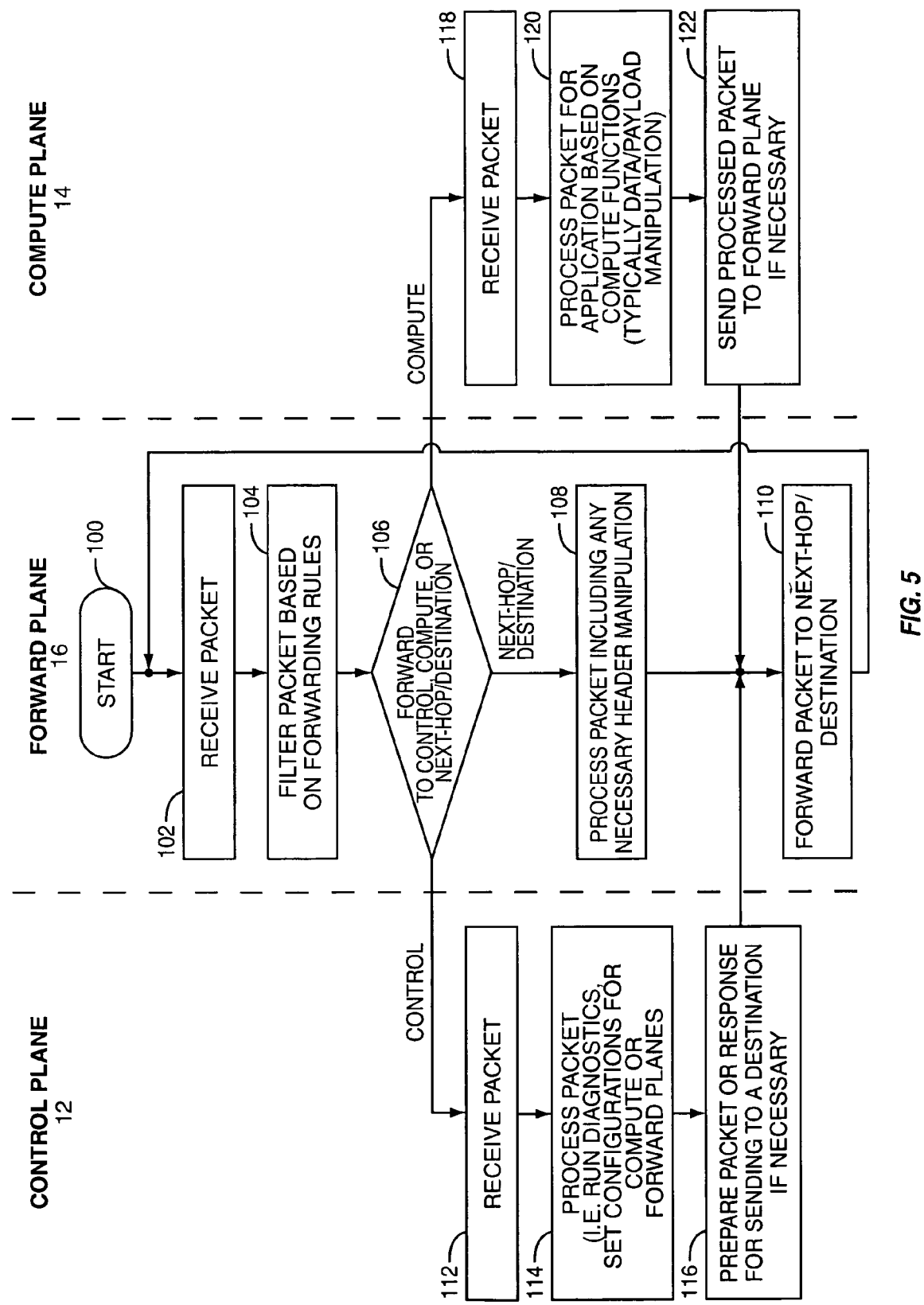
FIG. 5 is a flow diagram outlining the basic flow for processing packets in the control plane, compute plane, and/or the forward plane according to a preferred embodiment of the present invention.

Overall interaction between the control plane 12, compute plane 14, and forward plane 16 is outlined in the flow diagram of FIG. 5. Notably, the preferred processing for each of the three planes is illustrated. The process begins (block 100) with the forward plane 16 receiving all incoming packets regardless of whether the packets are intended for the routing node directly or simply sent to the routing node for routing. When a packet is received (block 102), the forward plane 16 will filter the packet based on the forwarding rules (block 104).

In general, the forwarding rules will dictate whether the packet is forwarded to the control plane 12, compute plane 14, or sent to the next-hop or destination after processing by the forward plane 16 (step 106). As discussed above, packets directed to the routing node 10, such as those used for diagnostics or to set configurations, are directed to the control plane 12. Packets requiring application level processing are sent to the compute plane 14. Packets for which the forward plane 16 can handle all processing are simply processed in the forward plane 16 and forwarded to the next-hop or destination. Typically, packets processed by the compute plane 14 and forward plane 16 are those requiring routing.

Assuming that the packet is one capable of being handled solely by the forward plane 16, the packet is processed accordingly in the forward plane 16 (block 108) and forwarded to the next-hop or destination (block 110). As noted, packet processing in the forward plane 16 is typically limited to header analysis and manipulation.

If the packet received by the forward plane 16 is determined to be one directed to the control plane 12 based on the forwarding rules (block 106), the packet is received by the control plane 12 (block 112) and processed by the control plane 12 accordingly (block 114). As noted, packets intended for the control plane 12 may facilitate diagnostic or control instructions for the compute plane 14, such as instructions to set particular configurations for the compute or forward planes 14, 16. For example, the compute plane 14 may receive information for establishing the forwarding rules for the forward plane 16 as well as configure the particular processing carried out by the compute plane 14 or the forward plane 16.

When the control plane 12 needs to respond to communications or deliver instructions to another network device, the control plane 12 will prepare a suitable packet or response for sending to a select destination (block 116). Preferably, the packet or packets associated with an outgoing communication from the control plane 12 are sent to the forward plane 16 wherein the packet or packets are forwarded to the next-hop or destination (block 110).

If the packet received by the forward plane 16 from the network is one requiring application level support and the forwarding rules direct the packet to the compute plane 14 (block 106), the packet is routed to the compute plane 14 accordingly. As described in further detail below, the forwarding rules may dictate where to send the packet within the compute plane 14 or how the packet will be processed once it is received by the compute plane 14. In general, the compute plane 14 receives the packet (block 118) and processes the packet as dictated by the application (block 120). As noted, preferably the application data or payload is processed in the compute plane 14.

In particular, the compute plane 14 is configured to carry out select functions to facilitate application level processing, which results in data or payload manipulation (block 120). The processing may require restructuring or re-packetizing the data or payload information depending on the particular application. Certain applications may simply process individual packets wherein other applications may require various types of data or payload reconstruction. For example, information in one packet may be used to create multiple new packets, or the information in multiple packets may be used to create a single packet. Regardless of the processing, the packets processed or provided by the compute plane 14 are sent to the forward plane 16 (block 122) for forwarding to the next-hop routing device or destination. As such, the forward plane 16 will receive packets from the compute plane 14 and forward the packet to the next-hop or destination (block 110).

Figure 6:
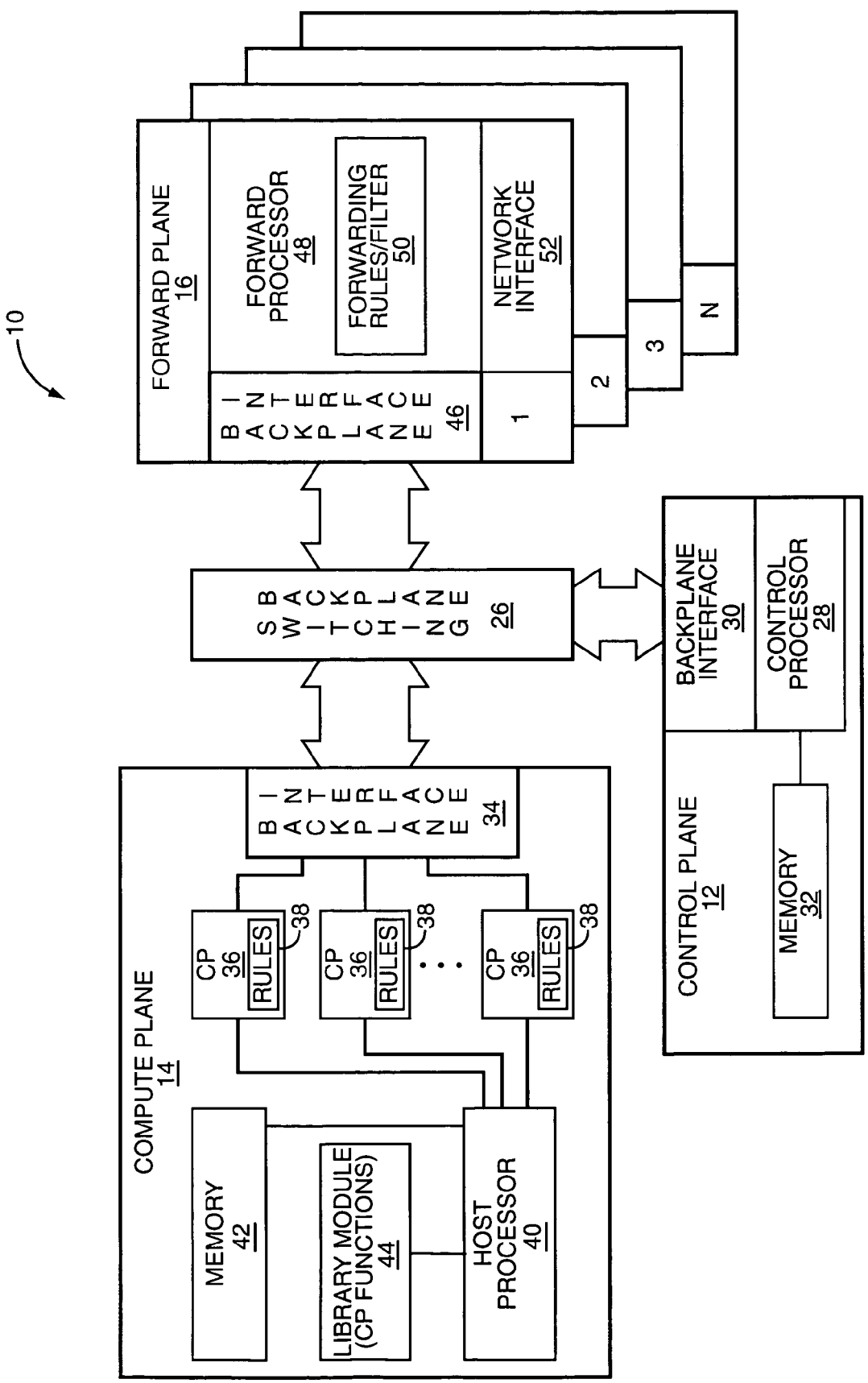
FIG. 6 is a block schematic of a preferred configuration of a routing node according to the present invention.

A block diagram of a preferred configuration of the switching node 10 is depicted in FIG. 6. Preferably, each of the control plane 12, compute plane 14 and forward plane 16 includes dedicated processing capability and is in communication with the other planes through a switching backplane 26. As such, the control plane 12 will include a control processor 28 associated with a backplane interface 30 coupled to the switching backplane 26 and will include sufficient memory 32 for storing the necessary instructions and data for operation.

The compute plane 14 includes a backplane interface 34 in communication with one or more high-speed compute processors (CP) 36. These compute processors 36 will include or be able to carry out select processes, rules or functions 38. Further, the compute processors 36 may stand alone or be controlled in part by a host processor 40. Preferably, the host processor 40 is associated with sufficient memory 42 for storing the necessary data and instructions for operation. The host processor 40 may also be associated with a library module 44, which may store various types of compute processor functions used to configure the function or rules 38 of the compute processors 36. The speed of the host processor 40 is not as critical as insuring that the compute processors 36 are capable of high-speed processing.

In an effort to maximize the processing speeds, the compute processors 36 may be implemented using field programmable gate arrays (FPGAs); application specific integrated circuits (ASICs); digital signal processing (DSP) components; network processors; or a combination thereof. Preferably, each compute processor 36 will include a processor and an FPGA or ASIC cooperating to maximize processing throughput. The processor facilitates configuration of the cooperating FPGA or ASIC, while the FPGA or ASIC processes the packets. Notably, the compute processor 36 is a generic name for any one or combination of hardware, firmware or software capable of providing the high-speed application processing required in the compute plane 14. Those skilled in the art will appreciate the numerous techniques available to provide high-speed processing.

The compute processor 36 is configured to carry out select functions or rules 38 at or close to wire-line speeds on the selected packets directed to the compute plane 14 from the forward plane 16. Importantly, the compute processors 36 may provide a combination of functions for varying applications or may be configured wherein each compute processor 36 carries out a dedicated function or rule 38. In the latter case, different compute processors 36 may facilitate different processing based on the function or rules 38. As such, the packets sent to the compute plane 14 from the forward plane 16 are directed to a select compute processor 36 capable of handling the application associated with the given packet.

The forward plane 16 includes a backplane interface 46 for communicating with the switching backplane 26. The backplane interface 46 of the forward plane 16 is associated with a forward processor 48 capable of implementing select forwarding rules 50 that facilitate packet filtering and delivery to the control plane 12, compute plane 14, and the next-hop or destination. The forward processor 48 provides the typical routing processing and functions in traditional fashion for those packets that do not require the application processing of the compute plane 14. The forward processor 48 is also associated with a network interface 52, which is coupled to the packet-switched network for receiving and sending packets.

The network interface 52 may be any type of network interface, including a 10 Base T, 100 Base T, or gigabit Ethernet interface. As depicted, given the necessary volume of traffic handled by the routing node 10, the forward plane 16 may be provided on multiple cards, all of which interface with the switching backplane 26. These cards may include their own forward processors 48 and network interfaces 52. Further, the compute plane 14 may be implemented on multiple cards in a fashion similar to that depicted for the forward plane 16.

As with the compute processors 36 in the compute plane 14, the forward processors 48 require high-speed processing capability. As such, the forward processor 48 is also an ASIC, FPGA, DSP device, network processor, or combination thereof. Preferably, as with the compute processors 36, the forward processors 48 are programmable in the sense that the forwarding rules 50 and basic processing configurations are programmable. Preferably, the compute processors 36 and the forward processors 48 are programmable and can be programmed under the control of the control plane 12.

In essence, it is preferable for the control plane 12 to be able to establish the forwarding rules 50 and configure processing for the forward plane 16. Similarly, the control plane 12 is preferably capable of setting the functions and rules 38 implemented by the compute processors 36 in the compute plane 14. Those skilled in the art will appreciate the tremendous flexibility in programming and configuring the compute plane 14 and the forward plane 16.

For example, assume that for a given media stream application level processing is required for type A packets and basic forwarding is required for type B packets. Configuration instructions may be sent to the routing node 10 defining the type A and B packets within the media stream and the processing function to provide on the type A packets. The configuration instructions may be sent in one or more packets, which will be forwarded to the control plane 12 by the forward plane 16. Upon receipt, the control plane 12 will configure the forward plane 16 to recognize the type A and B packets in the media stream and forward the type A packets to the compute plane 14 and the type B packets on to the next-hop or the final destination.

Those skilled in the art will recognize that the routing node 10 of the present invention may be used in homogeneous as well as heterogeneous networks. For example, the routing node 10 may be implemented as a router in a packet-switched network or in a media gateway, bridging like or different networks. In the latter case, the compute plane 14 is very effective in allowing the processing of packets or content being converted from one format or protocol to another.

The present invention provides a compute plane 14 facilitating application processing during routing. Regardless of the processing function, the compute plane 14 in the routing node 10 allows the forward plane 16 to maintain the extremely high processing and forwarding speeds required for traditional routing and maximizes processing speeds for packets requiring processing at an application level during routing. The present invention allows tremendous flexibility in configuring routers and adds the ability to provide application processing at or near wire-line speeds without effecting normal routing speeds of the forward plane 16 or requiring additional computation power in the control plane 12.

Those skilled in the art will recognize improvements and modifications to the disclosed embodiments of the present invention. For example, the routing devices of the present invention may be any number of network devices, including routers, switches, gateways, aggregation devices, network distribution devices, core routers, wireless base stations, wireless access points, and multiplexors (electrical and optical). All such improvements and modifications are considered within the scope of the concepts disclosed herein and the claims that follow.

What is claimed is:

1. A routing node comprising a forward plane, a compute plane, and a control plane, the forward plane adapted to:
   a) receive packets including first packets requiring basic forwarding by the forward plane, second packets requiring processing by the compute plane, and third packets requiring processing by the control plane;
   b) send the second packets to the compute plane and the third packets to the control plane;
   c) receive processed packets from the compute plane; and
   d) forward the first packets and the processed packets received by the compute plane;
   the compute plane adapted to provide application level processing on the second packets received from the forward plane and return the processed packets to the forward plane for forwarding; and
   the control plane adapted to configure the compute plane and the forward plane.

2. The routing node of claim 1 wherein the forward plane is further adapted to implement forwarding rules on the packets received to identify and forward the first packets, the second packets, and the third packets.

3. The routing node of claim 2 wherein the control plane further comprises a filter for implementing the forwarding rules on the packets received.

4. The routing node of claim 2 wherein the forwarding rules are based on at least one header in the packets received and the forward plane is further adapted to analyze the at least one header in the packets received in light of the forwarding rules to identify the first packets, the second packets, and the third packets.

5. The routing node of claim 2 wherein the control plane is adapted to at least partially define the forwarding rules.

6. The routing node of claim 1 wherein the compute plane is further adapted to process application data carried in payloads of the second packets according to an application to create the processed packets.

7. The routing node of claim 1 wherein the second packets require processing according to one of a plurality of unique applications and the compute plane is further adapted to process the second packets according to a corresponding one of the plurality of unique applications to create the processed packets.

8. The routing node of claim 1 wherein the compute plane includes a plurality of compute processors adapted to provide the application level processing on the second packets such that application level processing is distributed among the plurality of compute processors.

9. The routing node of claim 1 wherein the second packets require processing according to one of a plurality of unique applications and the compute plane includes a plurality of compute processors adapted to provide the application level processing on the second packets according to a corresponding one of the plurality of unique applications to create the processed packets.

10. The routing node of claim 1 wherein the control plane is adapted to at least partially define functions facilitating the application level processing on the second packets.

11. The routing node of claim 10 wherein the control plane is further adapted to at least partially define the forwarding rules.

12. The routing node of claim 1 wherein the control plane is further adapted to receive at least one of the third packets and configure at least one of the forward plane and the compute plane based on the at least one of the third packets.

13. The routing node of claim 1 wherein the forward plane is further adapted to manipulate headers of the first packets to facilitate forwarding of the first packets over a network toward a destination.

14. The routing node of claim 1 wherein:
   a) the forward plane includes a network interface associated with a plurality of forward processors adapted to receive the packets via the network interface and implement forwarding rules on the packets received to identify the first packets, the second packets, and the third packets;
   b) the compute plane includes a plurality of compute processors adapted to provide the application level processing on the second packets such that the application level processing is distributed among the plurality of compute processors; and
   c) a backplane coupling together the forward plane, compute plane, and control plane.

15. The routing node of claim 14 wherein the compute plane further includes a host processor associated with each of the plurality of compute processors and adapted to establish processing rules to implement the application level processing for each of the plurality of compute processors.

16. The routing node of claim 14 wherein the forward processors and the compute processors are high-speed processing architectures consisting of one or a combination of the group consisting of field programmable gate arrays, digital signal processors, network processors, and application specific integrated circuits.

17. The routing node of claim 1 wherein the routing node is a router and the forward plane includes a network interface to facilitate packet-switched communication over a packet-switched network.

18. The routing node of claim 1 wherein the routing node is a media gateway and the forward plane is associated with a network interface to facilitate communications between at least two networks.

19. A routing architecture for a forward plane of a routing node including the forward plane, a compute plane, and a control plane, the architecture for the forward plane comprising:
   a) means for receiving packets including first packets requiring basic forwarding by the forward plane, second packets requiring processing by the compute plane, and third packets directed to the control plane;
   b) means for identifying the first packets, the second packets, and the third packets; and
   c) means for forwarding the third packets to the control plane; the second packets to the compute plane for processing; and the first packets and packets processed by the compute plane over a network toward a destination based on forwarding rules.

20. The routing architecture of claim 19 further comprising means for receiving processed packets from the compute plane.

21. The routing architecture of claim 19 wherein the forwarding rules are based on at least one header in the packets received and further comprising means for analyzing the at least one header in the packets received in light of the forwarding rules to identify the first packets, the second packets, and the third packets.

22. The routing architecture of claim 19 further comprising means for receiving instructions to configure at least a portion of the forwarding rules from the control plane.

23. The routing architecture of claim 19 wherein the compute plane is further adapted to process application data carried in payloads of the second packets according to an application to create the processed packets.

24. The routing architecture of claim 19 further comprising means for manipulating headers of the first packets to facilitate forwarding of the first packets over the network toward a destination.

25. A routing architecture for a compute plane of a routing node including a forward plane, the compute plane, and a control plane wherein the forward plane is adapted to receive packets including first packets requiring basic forwarding by the forward plane, second packets requiring processing by the compute plane, and third packets directed to the control plane, the architecture for the compute plane comprising:
   a) means for receiving the second packets requiring processing by the compute plane from the forward plane;
   b) means for processing the second packets at an application level to create processed packets; and
   c) means for sending the processed packets to the forward plane for forwarding over a network toward a destination.

26. The routing architecture of claim 25 wherein the means for processing processes application data carried in payloads of the second packets according to an application to create the processed packets.

27. The routing architecture of claim 25 wherein the second packets require processing according to one of a plurality of unique applications and the means for processing processes the second packets according to a corresponding one of the plurality of unique applications to create the processed packets.

28. A routing device comprising:
   a) a control plane for controlling the router;
   b) a compute plane adapted to process content contained in packets requiring application processing to provide processed packets; and
   c) a forward plane adapted to:
      i) receive packets requiring a basic forwarding service, packets requiring application processing, and packets for general control of the router;
      ii) process and forward the packets requiring the basic forwarding service;
      iii) send the packets requiring application processing to the compute plane;
      iv) receive the processed packets of the compute plane;
      v) forward the processed packets; and
      vi) send the packets for general control of the router to the control plane.

29. A method of routing packets using a forward plane, a compute plane, and a control plane comprising:
   a) in the forward plane, receiving packets including first packets requiring basic forwarding by the forward plane, second packets requiring processing by the compute plane, and third packets requiring processing by the control plane; sending the second packets to the compute plane and the third packets to the control plane; receiving processed packets from the compute plane; and forwarding the first packets and the processed packets received by the compute plane over a network toward a destination;
   b) in the compute plane, providing application level processing on the second packets received from the forward plane and returning the processed packets to the forward plane for forwarding; and
   c) in the control plane, configuring the compute plane and the forward plane.

30. The method of claim 29 further comprising, in the forward plane, identifying the first packets, the second packets, and the third packets from the packets received and forwarding the first packets, the second packets, and the third packets based on forwarding rules.

31. The method of claim 29 wherein the forwarding rules are based on at least one header in the packets received and further comprising, in the forward plane, analyzing the at least one header in the packets received in light of the forwarding rules to identify the first packets, the second packets, and the third packets.

32. The method of claim 29 further comprising, in the control plane, defining certain of the forwarding rules.

33. The method of claim 29 further comprising, in the compute plane, processing application data carried in payloads of the second packets according to an application to create the processed packets.

34. The method of claim 29 wherein the second packets require processing according to one of a plurality of unique applications and further comprising, in the compute plane, processing the second packets according to a corresponding one of the plurality of unique applications to create the processed packets.

35. The method of claim 29 further comprising, in the control plane, defining certain functions facilitating the application level processing on the second packets for the compute plane.

36. The method of claim 35 further comprising, in the control plane, defining certain of the forwarding rules for the forward plane.

37. The method of claim 29 further comprising, in the forward plane, manipulating headers of the first packets to facilitate forwarding of the first packets over the network toward the destination.

* * * * *